United States Patent
Gonnet et al.

(10) Patent No.: US 7,854,145 B2
(45) Date of Patent: Dec. 21, 2010

(54) PLASMA TORCH FOR OVERCLADDING AN OPTICAL FIBER PREFORM

(75) Inventors: Cedric Gonnet, Paris (FR); Laurent Calvo, Lille (FR); Emmanuel Petitfrere, Villeneuve d'Ascq (FR)

(73) Assignee: Draka Comteq, B.V., Amsterdam (NL)

( * ) Notice: Subject to any disclaimer, the term of this patent is extended or adjusted under 35 U.S.C. 154(b) by 657 days.

(21) Appl. No.: 11/769,092

(22) Filed: Jun. 27, 2007

(65) Prior Publication Data

US 2007/0295033 A1   Dec. 27, 2007

(30) Foreign Application Priority Data

Jun. 27, 2006   (FR) .................................. 06 05760

(51) Int. Cl.
*C03B 37/018* (2006.01)

(52) U.S. Cl. .................. 65/391; 65/483; 219/121.48

(58) Field of Classification Search ............ 65/391; 219/121.48
See application file for complete search history.

(56) References Cited

U.S. PATENT DOCUMENTS

| | | | |
|---|---|---|---|
| 4,833,294 A | 5/1989 | Montaser et al. | |
| 5,200,595 A | 4/1993 | Boulos et al. | |
| 5,254,829 A * | 10/1993 | Drouet et al. | 219/121.39 |
| 6,639,174 B2 | 10/2003 | Augeraud et al. | |
| 2003/0182971 A1 | 10/2003 | Rebreyend et al. | |
| 2007/0289332 A1 | 12/2007 | Petitfrere | |
| 2007/0295033 A1 | 12/2007 | Gonnet et al. | |

FOREIGN PATENT DOCUMENTS

| | | |
|---|---|---|
| EP | 1213950 A2 | 6/2006 |
| EP | 1874099 A1 | 2/2008 |

OTHER PUBLICATIONS

Extended European Search Report for corresponding European Application Serial No. 07011037, dated Oct. 1, 2007.
MACOR® Product Brochure, pp. 1-7, Corning Incorporated Lighting and Materials, Houghton Park C8-08, Corning, NY, USA.
Aluminum Oxide product information, (Accuratus Corp.) 4 pages, as downloaded from: www.accuratus.com/alumox.html.
Shapal® Data Sheet, RS Shapal-M soft, RS Components, P.O. Box 99, Corby Northants, 2 pages, issued Mar. 1997, as downloaded from: www.rs-components.hu/ds/232_6146.PDF.
French Search Report and Written Opinion in counterpart French Application No. FR 0605760, mailed Feb. 9, 2007.

* cited by examiner

*Primary Examiner*—Queenie Dehghan
(74) *Attorney, Agent, or Firm*—Summa, Additon & Ashe, P.A.

(57) ABSTRACT

Disclosed is a plasma torch for overcladding a primary preform of an optical fiber. The plasma torch includes a confinement tube for confining an induced plasma and a torch base. The torch base has a ceramic surface internal to the confinement tube. The plasma torch has extended life even at high input powers.

12 Claims, 1 Drawing Sheet

ND AN OPTICAL FIBER PREFORM

PLASMA TORCH FOR OVERCLADDING AN OPTICAL FIBER PREFORM

CROSS-REFERENCE TO PRIORITY APPLICATION

This application hereby claims the benefit of pending French Application No. 06/05760 (filed Jun. 27, 2006 at the French Patent Office), which is hereby incorporated by reference in its entirety.

FIELD OF THE INVENTION

The present invention relates to a plasma torch for overcladding an optical fiber preform.

BACKGROUND OF THE INVENTION

An optical fiber is produced by drawing a preform on a drawing tower. A preform generally includes a primary preform consisting of a very high quality glass tube that forms a part of the cladding and the fiber core. This primary preform is then overcladded (or sleeved) to increase its diameter and form a preform that can be used on a drawing tower.

The primary preform is then overcladded using silica particles to yield a final preform. Although natural silica particles are typically used, synthetic and/or doped silica particles, which are relatively more expensive, may also be used. The overcladding of the primary preform may be conducted by plasma deposition during which particles of natural silica are projected and fused by a plasma torch at a temperature near 2,300° C. At this elevated temperature, the natural silica particles vitrify on the periphery of the primary preform. The overcladding operation is generally conducted in a closed chamber under a controlled atmosphere to ensure protection against electromagnetic disturbances and the release of ozone that is emitted by the plasma torch.

FIG. 1 schematically depicts a cross-sectional view of a conventional plasma torch 200 for overcladding an optical fiber preform 100. One such conventional plasma torch 200 is disclosed, for example, in European Patent Publication No. EP 1213950 A2 or U.S. Patent Application Publication No. 2003/0182971.

U.S. Pat. No. 4,833,294 discloses a plasma torch that includes a plasma tube for confining and directing gas flows within an electromagnetic field produced by a coil. The torch further includes a base member to receive the plasma tube and an exteriorly threaded insert member.

The plasma torch 200 depicted in FIG. 1 includes a confinement tube 201, which is used for confining the plasma. The confinement tube 201 may have a multi-wall structure to allow for flow of a liquid coolant. The confinement tube 201 of the plasma torch 200 should be capable of withstanding the extremely high temperatures that are generated in the region of the plasma. The confinement tube 201 is thus generally quartz, but it may also be thermo-conductive ceramic such as described in U.S. Pat. No. 5,200,595.

The plasma torch 200 depicted in FIG. 1 also includes a torch base 500, which is attached to one end of the confinement tube 201. The torch base 500 itself includes a support 502 and a gas diffuser 400. The support 502 and the gas diffuser 400 are generally stainless steel. At least one main gas inlet 203 is provided for injecting pressurized air into the confinement tube 201 of the plasma torch 200 in order to feed the plasma. An initiator gas, such as argon, may be injected at the beginning of the operation of the plasma torch 200 because of the low capability of air to initiate ionization. An induction coil 202 is wound around the confinement tube 201. The induction coil 202 is powered by the induction generator 210. Alternating electric current generates an electromagnetic field, which ionizes the gas (e.g., air) in the confinement tube 201 in order to create a plasma flame 600.

FIG. 1 also depicts an optical fiber preform 100 and projected silica grains 1000 between the preform 100 and the plasma flame 600. The silica grains 1000 are projected from a projection tube 300, which may optionally be integrated to the plasma torch 200.

The induction generator 210 used with the plasma torch 200 typically provides a maximum power on the order of 200 kilowatts (kW), but the power which may be applied to the induction coil 202 of the plasma torch 200 is often limited to about 100 kilowatts because of the conventional design of the plasma torch 200.

The greater the power of the induction generator 210, the larger the flame 600 of the plasma and the faster the overcladding may be carried out (i.e., more silica grains 1000 may be vitrified per unit of time). Therefore, for reasons of productivity and yield, it is desirable to increase the power of the plasma induced in the plasma torch 200 to, for example, 130-150 kilowatts.

When the power of the induction generator 210 increases, the plasma flame 600 extends. This extension towards the outside of the confinement tube 201 of the plasma torch 200 is beneficial because the plasma flame 600 then includes a larger amount of projected silica grains 1000 in front of the preform 100 and the overcladding yield is improved. When the plasma flame 600 is extended, however, it is also extended inside the confinement tube 201 and approaches the torch base 500. The torch base 500 then undergoes strong thermal stresses that may damage it. For example, when the power of the induction generator 210 of the plasma torch 200 has been increased in this way, the inventors have observed the occurrence of burning (e.g., charring or blackening) and flaking in the steel torch bases 500. Such deterioration of the torch base 500 may lead to the projection of impurities in overcladding the preform 100. Such contamination requires that the preform 100 be discarded, resulting in a productivity loss.

Therefore, there is a need for a plasma torch base that may withstand stronger operating power without deteriorating.

SUMMARY OF THE INVENTION

Accordingly, the invention embraces an improved plasma torch having a torch base 500 that is covered with a ceramic material. For instance, the torch base 500 may be formed of steel with its surface 501 internal to the confinement tube 201 being coated with a layer of ceramic material 700.

More specifically, the plasma torch includes a confinement tube 201 for confining an induced plasma and a torch base 500 that itself includes a support 502 and a gas diffuser 400. The torch base 500 has a surface 501 internal to the confinement tube 201. At least part of the torch base's surface that is internal to the confinement tube 201 and that that corresponds to torch base's support 502 and/or the gas diffuser 400 is coated with a ceramic material 700.

According to one embodiment, at least the support 502 or the gas diffuser 400 is made of ceramic material 700 (i.e., possesses a ceramic surface).

The ceramic material 700 may be aluminum nitride, silicon nitride, boron nitride, or alumina (i.e., aluminum oxide, $Al_2O_3$), or a mixture of these compounds.

According to another embodiment, the surface 501 of the support 502 and/or gas diffuser 400 (i.e., the surface internal to the confinement tube 201) is coated with aluminum oxide.

According to yet another embodiment, the ceramic material 700 has a thermal expansion coefficient less than or equal to $10 \times 10^{-6}/°C$. (i.e., about $1 \times 10^{-5}/°C$. or less).

According to yet another embodiment, the confinement tube 201 is quartz.

The invention also relates to an apparatus for overcladding an optical fiber preform 100. In this regard, the apparatus includes a preform support for receiving a primary preform 100, a projection means 300 to propel silica grains 1000 towards the primary preform 100, and at least one plasma torch 200 according to the invention, and a current generator 210 to supply an induction coil 202 of the plasma torch 200.

By way of example, projection means 300 embraces a discharge line for delivering and projecting silica particles at a controlled flow rate. The discharge line is, for example, a tube (e.g., silica, ceramic, or metal) that can be positioned to direct or otherwise guide the silica particles to the desired location on the preform 100. The discharge line may terminate in a conical-shaped end (e.g., a nozzle) to better direct the silica particles onto the preform 100. Those having ordinary skill in the art will appreciate that the delivery and projection of silica onto the preform 100 may also employ silica sprayers or silica injectors.

The invention further relates to a method for overcladding an optical fiber preform with this apparatus. In this regard, the current generator 210 feeds the plasma torch 200 with alternating current with at least 130 kilowatts of power.

Other advantages and features of the invention will become apparent upon reading the following description of invention embodiments, which are provided by way of example and with reference to the appended drawings.

DETAILED DESCRIPTION

Figure 1:
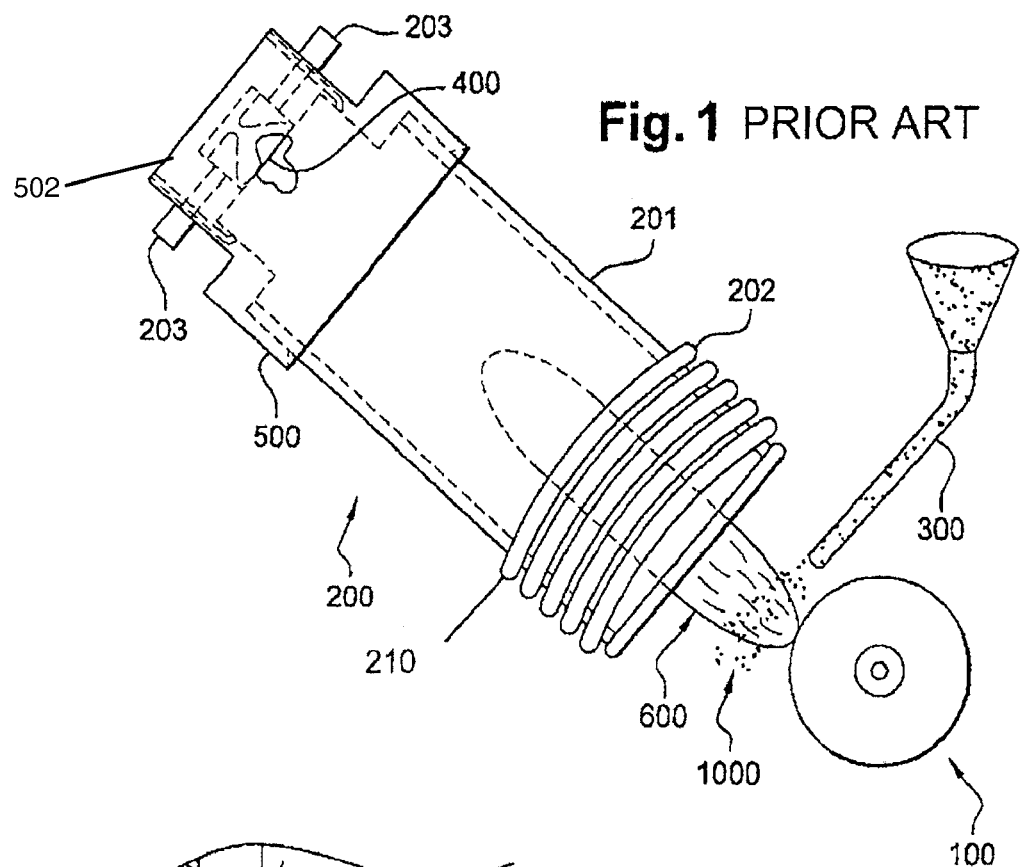
FIG. 1 depicts a cross-sectional view of a plasma torch according to the prior art.
Figure 2:
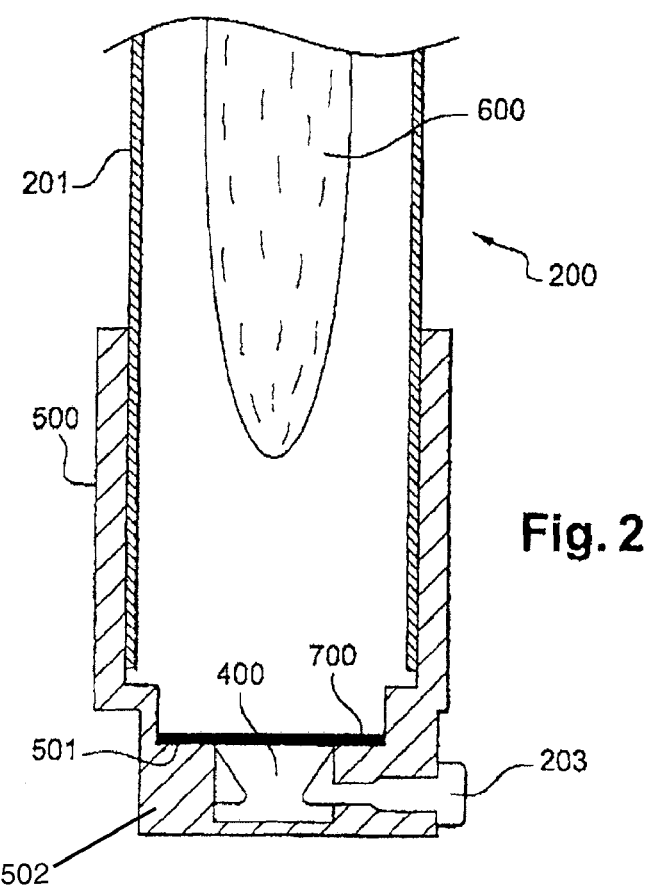
FIG. 2 depicts a cross-sectional view of an exemplary embodiment of a plasma torch according to the present invention.

In one aspect, the invention proposes a plasma torch 200 for overcladding an optical fiber preform 100. The plasma torch 200 includes a confinement tube 201 for confining the induced plasma and a torch base 500. The confinement tube is typically quartz for cost-effectiveness and temperature-resistance. The torch base 500 has a surface 501 internal to the confinement tube 201, this surface 501 being at least partially covered with a ceramic material 700.

As noted previously, it is desirable to extend the plasma flame 600 in order to increase the yield of the overcladding. Because the plasma flame 600 then approaches the surface 501 of the torch base 500, this surface 501 must then be protected to prevent premature deterioration of the torch base 500.

According to one embodiment of the invention, the torch base's surface that is internal to the confinement tube 201 is coated with a ceramic material 700.

Suitable ceramic materials for producing a torch base 500 for a plasma torch 200 according to the invention include, for example, ceramic material marketed by Corning under the MACOR® trademark or by Tokuyama Soda under the SHAPAL® trademark.

As noted, the support 502 and the gas diffuser 400 are typically stainless steel. A ceramic material layer, such as aluminum oxide ($Al_2O_3$), is fixed onto the surface 501 of the torch base 500. For example, a ceramic chip may be glued (or otherwise secured) to the surface of the diffuser 400 and/or a ceramic ring may be glued or otherwise secured to the surface of the support 502 of the torch base 500. The ceramic material 700 may have a thickness between 1 millimeter and 2.5 millimeters, and may be machined before being affixed for better adhesion onto the surface of the torch base 500.

Of course, other embodiments are possible. For example, the gas diffuser 400 may be made in ceramic whereas a ceramic ring covers the support 502 of the torch base 500 around the gas diffuser 400.

The ceramic selected for covering the surface of the torch base 500 possesses a high temperature of use (e.g., above 800° C.) and a low thermal expansion coefficient (e.g., less than or equal to $10 \times 10^{-6}/°C$.) in order to limit distortions in the torch base. The respective ceramic materials available under the MACOR® and SHAPAL® trademarks have a high dielectric resistance of around 40 kV/mm, which limits the occurrence of an electric arc. Moreover, such ceramic materials (e.g., MACOR® and SHAPAL® products) used for covering the surface 501 of the torch base 500 may have relatively different heat conductivity values. For example, aluminum oxide ($Al_2O_3$) and the ceramic material available under the MACOR® trademark have a low heat conductivity, which limits energy losses of the plasma torch 200 through the torch base 500. In contrast, the ceramic material available under the SHAPAL® trademark has a high heat conductivity by which the heat generated by the plasma flame 600 may be effectively removed. High heat conductivity limits the surface temperature of the torch base 500 and thereby increases its lifetime.

Table 1 (below) reports properties for three relevant ceramic materials that are suitable for covering the torch base 500. In particular, Table 1 provides data values with respect to maximum operating temperature (° C.), dielectric resistance (kV/mm), thermal conductivity at about 25° C. (W/m·K), and thermal expansion coefficient (e.g., to about 300° C.).

TABLE 1

|  | $T_{max}$ (° C.) | thermal $R_{dielectric}$ (kV/mm) | conductivity (@25° C.)(W/m · K) | thermal expansion coefficient ($10^{-6}/°C$.) |
|---|---|---|---|---|
| MACOR ® | 800 | 40 | 1.46 | 9.3 |
| SHAPAL ® | 1,000 | 40 | 90 | 4.4 |
| $Al_2O_3$ | 1,850 | 12 | 9.1 | 8.6 |

In another aspect (and in accordance with the foregoing), the invention proposes an apparatus for overcladding an optical fiber preform 100. The apparatus includes at least one plasma torch 200 in accordance with the present invention. In particular, as compared with a conventional plasma torch, a plasma torch 200 according to the present invention has an improved life at high powers (e.g., greater than 130 kilowatts) provided by a current generator 210. In this regard, an exemplary apparatus (and associated method) for overcladding an optical fiber preform is disclosed in commonly assigned U.S. patent application Ser. No. 11/765,083 ("Method for Overcladding an Optical Fiber Preform"), which is hereby incorporated by reference in its entirety.

In the specification and the figures, typical embodiments of the invention have been disclosed. Specific terms have been used only in a generic and descriptive sense, and not for purposes of limitation. The scope of the invention is set forth in the following claims.

The invention claimed is:

1. A plasma torch (200) comprising:
   a confinement tube (201) for confining an induced plasma;
   a torch base (500) having a stainless steel surface (501) internal to the confinement tube (201), wherein the torch base (500) comprises a support (502) and a gas diffuser (400), wherein said stainless steel surface (501) internal to the confinement tube (201) is coated with a ceramic material (700);
   an induction coil (202) that is wound around said confinement tube (201) to create a plasma flame (600); and
   a current generator (210) feeding said induction coil (202) of the plasma torch (200) at an input power of at least about 130 kilowatts.

2. The plasma torch (200) according to claim 1, wherein said gas diffuser (400) is made of ceramic-coated stainless steel.

3. The plasma torch (200) according to claim 1, wherein said ceramic material (700) is selected from the group consisting of aluminum nitride, silicon nitride, boron nitride, aluminum oxide, or mixtures thereof.

4. The plasma torch (200) according to claim 1, wherein said ceramic material (700) comprises aluminum oxide.

5. The plasma torch (200) according to claim 1, wherein said ceramic material (700) has a thermal expansion coefficient less than or equal to $10 \times 10^{-6}/°$ C.

6. A plasma torch (200) according to claim 1, wherein said confinement tube (201) comprises quartz.

7. An apparatus for overcladding an optical fiber preform, said apparatus comprising:
   a preform support for receiving a primary preform (100);
   projection means (300) to propel silica grains (1000) towards the primary preform (100); and
   at least one plasma torch (200) according to claim 1.

8. The plasma torch (200) according to claim 1, wherein said gas diffuser (400) is entirely ceramic.

9. A plasma torch (200), comprising:
   a confinement tube (201) for confining an induced plasma; and
   a torch base (500) comprising a support (502) and a gas diffuser (400), said torch base having a stainless steel surface (501) internal to the confinement tube (201), wherein a portion of said stainless steel torch base surface (501)
   (i) internal to said confinement tube (201) and
   (ii) corresponding to said torch base support (502) is coated with a ceramic material (700) having a thermal expansion coefficient (at below 300° C.) of less than about $10^{-5}/°$ C.;
   an induction coil (202) that is wound around said confinement tube (201) to create a plasma flame (600); and
   a current generator (210) feeding said induction coil (202) of the plasma torch (200) at an input power of at least about 130 kilowatts.

10. The plasma torch (200) according to claim 9, wherein said ceramic material (700) comprises aluminum oxide.

11. The plasma torch (200) according to claim 9, wherein said ceramic material (700) comprises aluminum nitride, silicon nitride, boron nitride, aluminum oxide, or mixtures thereof.

12. A plasma torch (200) according to claim 9, wherein said confinement tube (201) comprises quartz.

* * * * *

UNITED STATES PATENT AND TRADEMARK OFFICE
CERTIFICATE OF CORRECTION

PATENT NO. : 7,854,145 B2
APPLICATION NO. : 11/769092
DATED : December 21, 2010
INVENTOR(S) : Cedric Gonnet, Laurent Calvo and Emmanuel Petitfrere It is certified that error appears in the above-identified patent and that said Letters Patent is hereby corrected as shown below:

In the Specification:

Column 4, Table 1 is depicted as:

|  | $T_{max}$ (°C) | ~~thermal~~ $R_{dielectric}$ (kV/mm) | conductivity (@25°C) (W/m·K) | thermal expansion coefficient ($10^{-6}$/°C) |
|---|---|---|---|---|
| MACOR® | 800 | 40 | 1.46 | 9.3 |
| SHAPAL® | 1,000 | 40 | 90 | 4.4 |
| $Al_2O_3$ | 1,850 | 12 | 9.1 | 8.6 | and should be depicted as:

|  | $T_{max}$ (°C) | $R_{dielectric}$ (kV/mm) | thermal conductivity (@25°C) (W/m·K) | thermal expansion coefficient ($10^{-6}$/°C) |
|---|---|---|---|---|
| MACOR® | 800 | 40 | 1.46 | 9.3 |
| SHAPAL® | 1,000 | 40 | 90 | 4.4 |
| $Al_2O_3$ | 1,850 | 12 | 9.1 | 8.6 |

Signed and Sealed this
First Day of November, 2011

David J. Kappos
*Director of the United States Patent and Trademark Office*